United States Patent
Simic et al.

(10) Patent No.: US 8,130,145 B2
(45) Date of Patent: Mar. 6, 2012

(54) RECEIVE DIVERSITY IN GNSS RECEIVERS

(75) Inventors: Emilija M. Simic, La Jolla, CA (US); Douglas Neal Rowitch, Del Mar, CA (US); Sundar Raman, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 12/491,093

(22) Filed: Jun. 24, 2009

(65) Prior Publication Data

US 2010/0328155 A1    Dec. 30, 2010

(51) Int. Cl.
*G01S 19/36* (2010.01)
(52) U.S. Cl. .................................... 342/357.76
(58) Field of Classification Search ............... 342/357.76
See application file for complete search history.

(56) References Cited

U.S. PATENT DOCUMENTS

| 7,327,944 | B2 | 2/2008 | Shiohara | |
| 2005/0162305 | A1* | 7/2005 | Wells | ........................ 342/357.02 |
| 2008/0291079 | A1 | 11/2008 | Chang | |
| 2009/0135060 | A1 | 5/2009 | Lennen et al. | |
| 2010/0039316 | A1* | 2/2010 | Gronemeyer et al. | ... 342/357.06 |

FOREIGN PATENT DOCUMENTS

| GB | 2367199 | | 3/2002 |
| WO | WO0014569 | | 3/2000 |
| WO | WO2004040328 | A1 | 5/2004 |

OTHER PUBLICATIONS

International Search Report and Written Opinion—PCT/US2010/039823, International Search Authority—European Patent Office—Dec. 3, 2010.

* cited by examiner

*Primary Examiner* — Harry Liu
(74) *Attorney, Agent, or Firm* — Shyam K. Parekh; Howard H. Seo

(57) ABSTRACT

The subject matter disclosed herein relates to receiving one or more SPS signals at two or more physically separated antennae. In an aspect, signals from the physically separated antennae may be downconverted into complex digital signals that may undergo further processing to improve one or more performance metrics related to position estimation operations, for example.

44 Claims, 10 Drawing Sheets

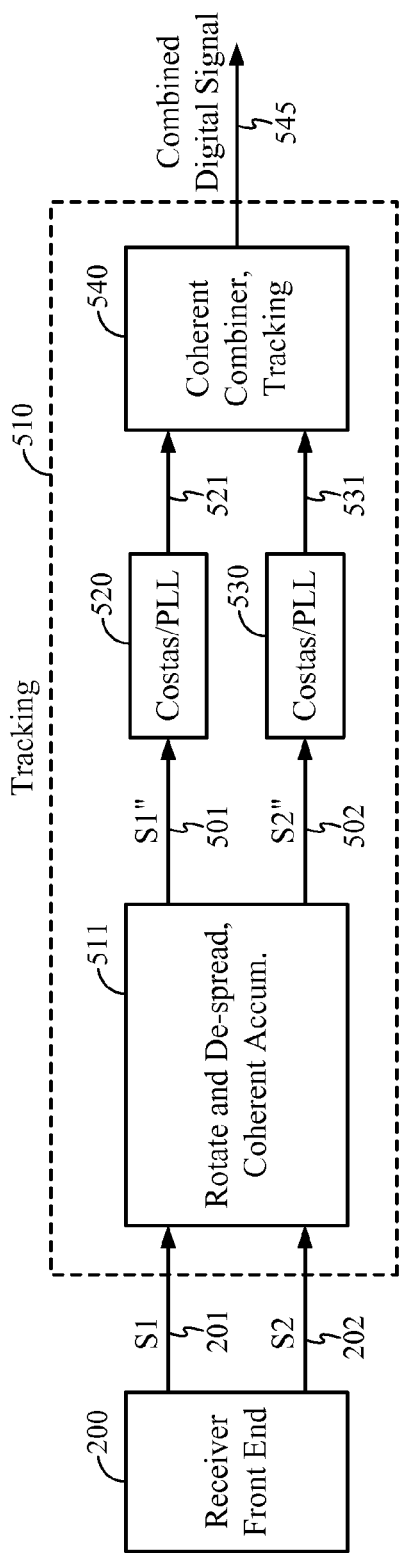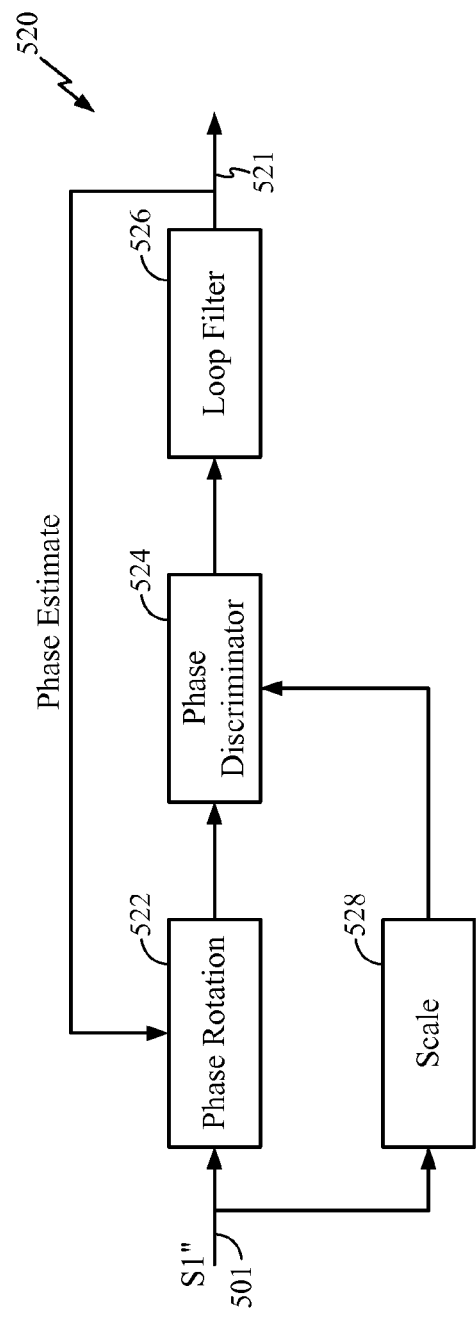
FIG. 5
FIG. 6

RECEIVE DIVERSITY IN GNSS RECEIVERS

BACKGROUND

1. Field

The subject matter disclosed herein relates to receiving a wireless signal transmitted from a communication system such as, for example, a global navigation satellite system.

2. Information

A satellite positioning system (SPS) may comprise a system of transmitters positioned to enable entities to determine their location on the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellites. For example, a satellite in a constellation of a Global Navigation Satellite System (GNSS) such as Global Positioning System (GPS), Galileo, Glonass or Compass may transmit a signal marked with a PN code that is distinguishable from PN codes transmitted by other satellites in the constellation. To estimate a location at a receiver, a navigation system may determine pseudorange measurements to satellites "in view" of the receiver using well known techniques based, at least in part, on detections of PN codes in signals received from the satellites FIG. 1 illustrates an application of an SPS system, whereby a mobile station (MS) 100 in a wireless communications system receives transmissions from space vehicles (SV) 102a, 102b, 102c, 102d in the line of sight to MS 100, and derives time measurements from four or more of the transmissions. MS 100 may provide such measurements to location server 104, which determines or estimates the position of the station from the measurements. Alternatively, the subscriber station 100 may determine or estimate its own position from this information.

Wireless communications system receivers or position location system receivers, such as, for example, mobile station 100 described above, may experience difficulties in signal acquisition and/or tracking under various conditions. Such conditions may include weak and/or fading signals, frequency drift, and noise, to name but a few examples. These conditions may result in, for example, reduced acquisition sensitivity, degraded data demodulation performance, reduced availability of signals, diminished measurement quality, and increases in "time to fix" (TTF) for a position determination.

SUMMARY

In one aspect, one or more wireless signals may be received at two or more physically separated antennae of a mobile station. The two or more antennae may provide a respective two or more radio frequency signals to a receiver of the mobile station. One or more of said radio frequency signals may be downconverted in one or more respective paths of the receiver to generate one or more intermediate frequency signals, and the one or more intermediate frequency signals may be converted to one or more complex digital signals comprising in-phase and quadrature components. The one or more complex digital signals may be processed to perform position estimation operations, including detecting one or more peaks.

BRIEF DESCRIPTION OF THE FIGURES

Non-limiting and non-exhaustive examples will be described with reference to the following figures, wherein like reference numerals refer to like parts throughout the various figures.

FIG. 5 is a schematic block diagram of an example offline coherent combiner unit.

FIG. 6 is a schematic block diagram of an example phase estimation unit.

DETAILED DESCRIPTION

Figure 1:
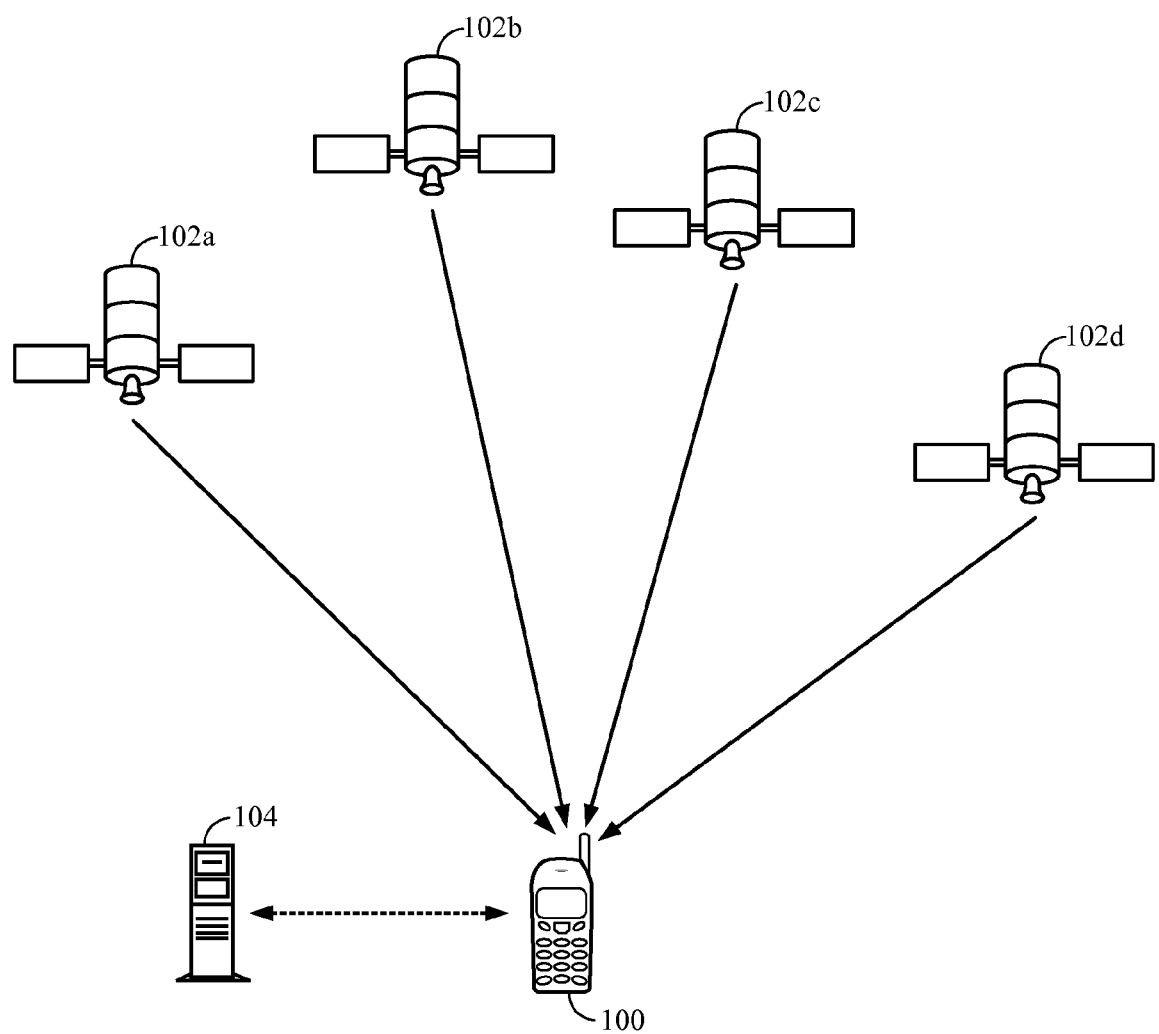
FIG. 1 is a block diagram of an example satellite position system (SPS) including a mobile station.

As discussed above, wireless communications system receivers or position location system receivers, such as, for example, mobile station 100 described above, may experience difficulties in signal acquisition and/or tracking under various conditions, such as, for example, weak and/or fading signals, frequency drift, and noise. These conditions may result in reduced acquisition sensitivity, degraded data demodulation performance, reduced availability of signals, diminished measurement quality, and increases in "time to fix" (TTF) for a position estimation, for example.

In one aspect, to improve mobile station receiver performance in light of the above-mentioned conditions, a receiver may incorporate two or more physically separated antennae. A signal transmitted by an SPS may be received at the two or more physically separated antennae, and the signals received at the separate antennae may undergo different wireless channel conditions. Combining the signals from the different paths may significantly improve signal quality in such circumstances. Further, combining signals from different paths may aid in removing at least some thermal noise, in at least some circumstances.

In another aspect, samples from the two or more spatially separated antennae may be combined using various combining algorithms, including, for example, non-coherent and coherent algorithms. Selection and/or scanning algorithms may also be employed, as discussed more fully below. The combining of the signals may result in various advantages including, for example, improved acquisition and tracking sensitivity for GNSS signals, improved data demodulation performance, increased availability of signals, enhanced measurement quality, and/or decreases in TTF for position estimation operations.

Under conditions where a signal is fading, the result may be a decrease in received signal strength. However, if the fading signal is received at two physically separated antennae, it is less likely that signals at both antennae will be subject to similar fading. That is, the signals received at the different antennae may fade in a less correlated fashion. Example combining techniques described herein may make use of this property to improve receiver sensitivity. Improvements may also be gained in noisy environments where combining the signals received at the physically separated antennae may result in up to 1.5-3 dB improvement, for example. The use of two or more physically separate antennae may be referred to as "spatial diversity."

As used herein, the term "mobile station" (MS) refers to a device that may from time to time have a position location that changes. The changes in position location may comprise changes to direction, distance, orientation, etc., as a few examples. In particular examples, a mobile station may comprise a cellular telephone, wireless communication device, user equipment, laptop computer, other personal communication system (PCS) device, personal digital assistant (PDA), personal audio device (PAD), portable navigational device, and/or other portable communication devices. A mobile station may also comprise a processor and/or computing platform adapted to perform functions controlled by machine-readable instructions. In the following discussion, various additional example aspects of a mobile station are described.

Figure 2:
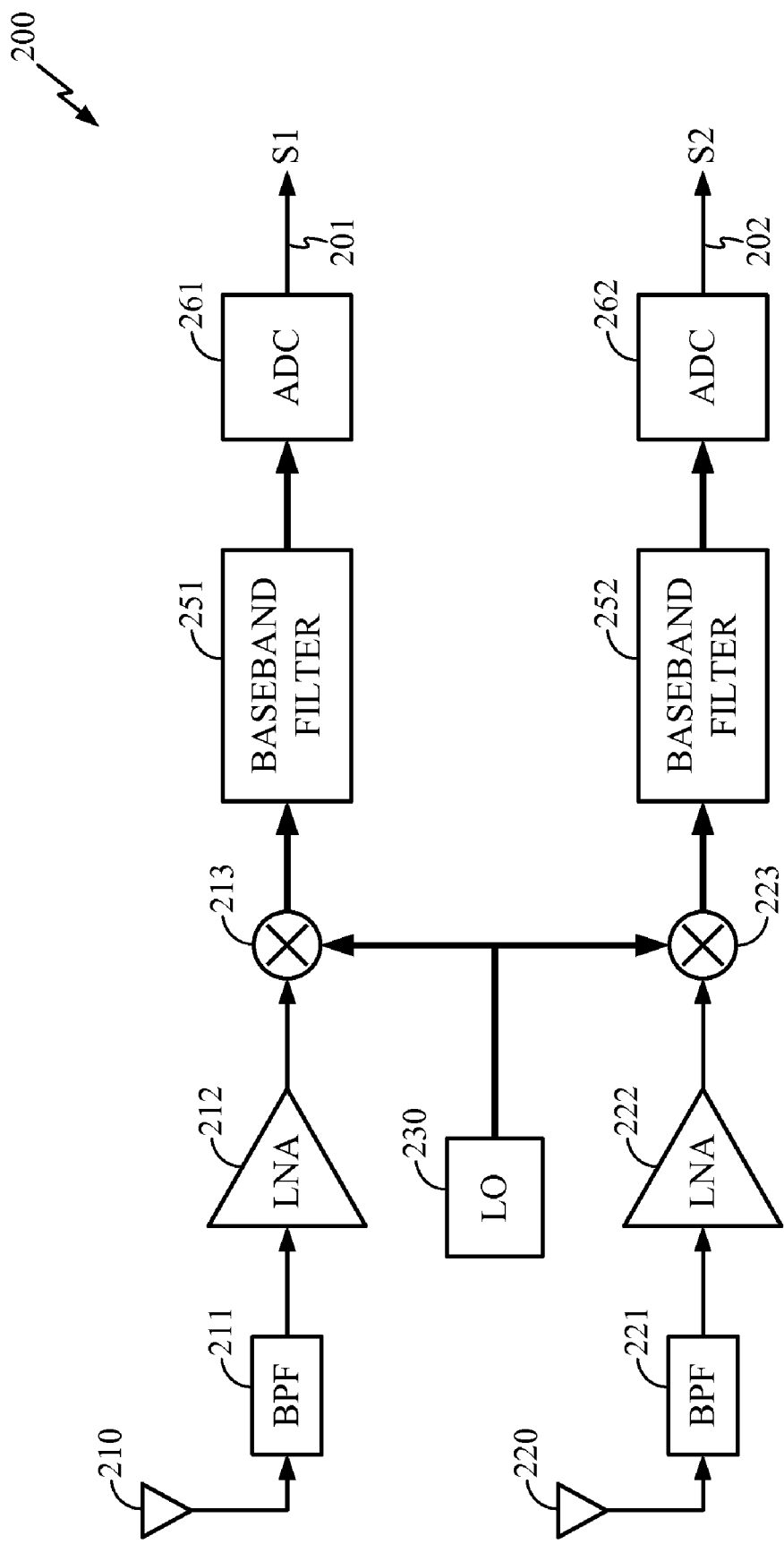
FIG. 2 is a schematic block diagram of an example mobile station receiver.

FIG. 2 is a schematic block diagram of an example mobile station receiver front end circuit 200. In an aspect, mobile station 100 may comprise receiver front end circuit 200. For the present example, antenna 210 and antenna 220 are included. Antenna 210 in an aspect may be associated with a receiver path including a Band Pass Filter (BPF) 211, a low noise amplifier (LNA) 212, and a complex downconverter 213. The receiver path for this example also includes a baseband filter 251 and an analog-to-digital converter 261. Antenna 220 in another aspect may be associated with an additional, separate receiver path including a BPF 221, an LNA 222, and a complex downconverter 223. The separate receiver path may also include a baseband filter 252 and an analog-to-digital converter 262. In one aspect, antennae 210 and 220 may comprise any antenna capable of receiving radio frequency signals. In another aspect, antennae 210 and 220 may be physically separated by some distance. For one example, the distance may comprise approximately the wavelength of the signal expected to be received at the antennae. Of course, this is merely one example distance by which the antennae may be separated, and the scope of claimed subject matter is not limited in this respect.

In an aspect, complex downconverters 213 and 223 may be provided with an oscillating signal from local oscillator (LO) 430. In this manner, a single oscillator may be used for both complex downconverters. However, the scope of claimed subject matter is not limited in this respect. In another aspect, complex downconverter 213 may receive a higher frequency real signal from LNA 212 and may utilize the signal provided by LO 230 to downconvert the signal from LNA 212 to a lower frequency complex signal that may be provided to baseband filter 251. The lower frequency complex signal generated by complex downconverter 213 may be referred to as an analog baseband signal comprising in-phase and quadrature components. Similarly, complex downconverter 223 may utilize the signal provided by LO 230 to downconvert the higher frequency real signal received from LNA 222 to a complex analog baseband signal that may be provided to baseband filter 252.

As used herein, "downconversion" is related to transforming an input signal having a first frequency characteristic to an output signal having second frequency characteristic. In one particular implementation, although claimed subject matter is not limited in this respect, such a downconversion may comprise transformation of a first signal to a second signal, where the second signal has a frequency characteristic of a lower frequency than that of the first signal. Here, in particular examples, such a downconversion may comprise transformation of a radio frequency (RF) signal to a baseband signal and/or baseband information. However, these are merely examples of a downconversion and claimed subject matter is not limited in this respect.

Analog-to-digital converter (ADC) 261 may receive the analog baseband signal from baseband filter 251 and may generate a complex digital signal S1 201 comprising in-phase and quadrature components. ADC 262 may receive the analog baseband signal from baseband filter 252 and may generate a second, separate complex digital signal S2 202. A digital baseband processing engine may then process complex digital signals S1 201 and S2 202 to perform navigation operations, to name merely one example application. As will be described below, complex digital signals S1 201 and S2 202, derived from signals received at the physically separate antennae, may be combined or otherwise utilized using any of the various example combining, scanning, and/or selecting algorithms described below to improve any of a number of performance aspects of the mobile station.

Although examples described herein disclose two antennae and two receiver front end paths, other examples may utilize more than two antennae and receiver front end paths. Also, although the two receiver front end signal paths depicted in receiver front end 200 of FIG. 2 are described as retaining separate paths from the antennae to the output of ADCs 261 and 262, other examples in accordance with claimed subject matter may combine the signal paths at some point in order to share components, for example. Combined signals may be separated at another point by a complex downconversion process, thereby restoring separate baseband signals and signal paths. However, this is merely an example of how some functions of a receiver front end may be combined, and the scope of claimed subject matter is not limited in this respect. Further, although examples described herein are centered around GNSS receivers, the scope of claimed subject matter is not limited in this respect, and the various aspects disclosed herein may be generalized for use in non-GNSS receivers.

Figure 3:
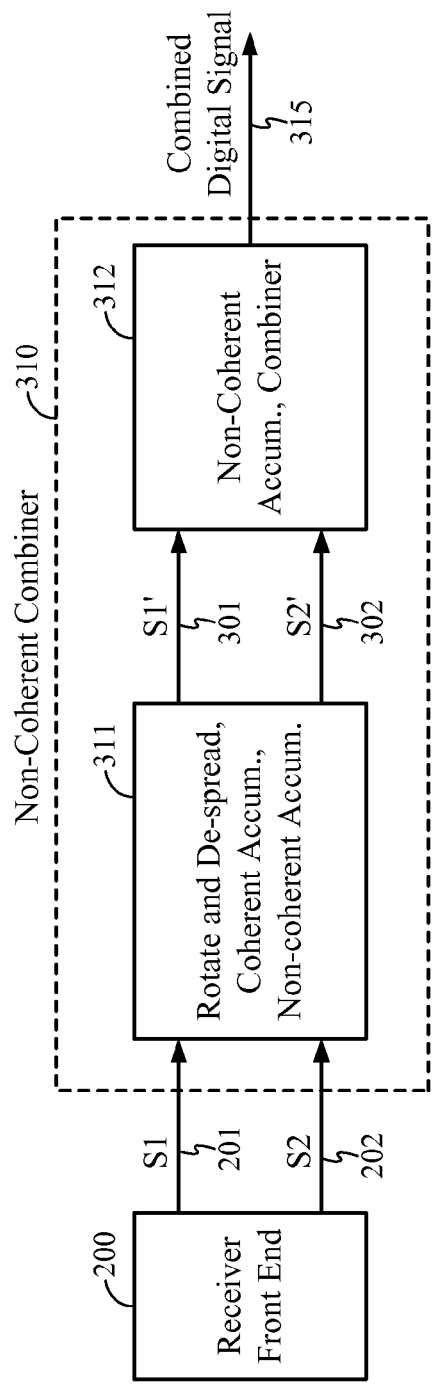
FIG. 3 is a schematic block diagram of an example non-coherent combiner unit.

FIG. 3 is a schematic block diagram of an example non-coherent combiner unit 310. As discussed above, to improve mobile station receiver performance in light of various signal degrading conditions, a mobile station may incorporate two or more physically separated antennae. A signal transmitted by an SPS may be received at the two or more physically separated antennae, and the signals received at the separate antennae may undergo different wireless channel conditions. Combining the signals from the different paths may significantly improve signal quality and improve mobile station performance in signal acquisition and tracking.

For the example of FIG. 3, example receiver front end 200, described above and depicted in FIG. 2, may generate two complex digital signals S1 201 and S2 202. The two complex digital signals for this example may be non-coherently combined to produce a combined digital signal 315 that may be used for position estimation operations, to name but one example application. Combined digital signal 315 in one aspect may undergo correlation peak detection operations in preparation for additional processing by a measurement and location engine as part of position estimation operations for the mobile station.

Non-coherent combiner 310 may comprise a first unit 311 where the two complex digital signals S1 and S2 may undergo despreading and rotation operations using techniques known to those of ordinary skill in the art, for example. Also, coherent accumulation and non-coherent accumulation operations may be performed. The resulting sample streams S1' 301 and S2' 302 may be received at a combiner unit 312, which for the present example may comprise a non-coherent accumulation combiner. Combiner 312 may generate combined digital signal 315.

It should be observed that for the non-coherent combining example of FIG. 3, two separate branches are maintained until signals are combined at non-coherent combiner 312. In an aspect, separate branches are maintained for the rotation and despreading operations, and for the coherent and non-coherent accumulations performed at unit 311. The resulting sums of the non-coherent accumulations for each branch are added within the non-coherent combiner 312, in one aspect. For the present example, S1' 301 and S2' 302 represent rotated and despread S1 and S2 signals, respectively, that have further undergone coherent accumulations followed by non-coherent accumulations. Continuing with the present example, let $$S1' = \sum_{j=1}^{K} \left( \left( \sum_{i=1}^{M} I_{i,1} \right)^2 + \left( \sum_{i=1}^{M} Q_{i,1} \right)^2 \right) \quad (1)$$

and $$S2' = \sum_{j=1}^{K} \left( \left( \sum_{i=1}^{M} I_{i,2} \right)^2 + \left( \sum_{i=1}^{M} Q_{i,2} \right)^2 \right)$$

where $I_{i,1}$, $Q_{i,1}$, $I_{i,2}$, $Q_{i,2}$ are the in-phase and quadrature samples for the two branches for S1 and S2 and $\{M,K\}$ are the number of coherent and non coherent summations respectively. The summations inside the inner brackets in Equation 1 represent the coherent accumulation operations of unit 311, and the summations of the elements within the outer brackets represent the non-coherent accumulation operations of unit 311, for the present example. To produce combined digital signal 315, non-coherent combiner 312 produces $k_1 S1'+k_2 S2'$ at its output where $k_1, k_2$ represent combining weight values. Of course, weighting techniques are not limited to the $\{0,1\}$ scheme described above. Rather, this is merely one example weighting technique, and the scope of claimed subject matter is not limited in this respect.

As previously mentioned, combined signal 315 may be subject to further processing similar to what may occur in receivers with single antennas to identify correlation peaks and to provide measurements for navigational operations, for one example application. However, because for this example two signals from physically separated antennae have been combined, signal integrity may be improved, and receiver performance may therefore be enhanced.

In an aspect, the two paths for signal streams S1 and S2 may have different group delay characteristics, resulting at least in part from such factors as temperature effects, filter effects, manufacturing process variables, and/or distance between the two antennae, to name but a few example factors. In order to compensate for such group delays, mobile station 100 may perform self-calibration operations to synchronize the paths of the receiver. In an aspect, the self-calibration operations may comprise measuring the difference in the delays from each path of the receiver if observable signals are present. The measured difference may be utilized to adjust the timing of one of the paths in order to synchronize the paths. In another aspect, the self-calibration operation may be performed as part of the manufacturing process for the receiver and/or the mobile station. Alternatively, the self-calibration operation may be performed in the field. The self-calibration operation may be performed a single time in one aspect, or may be performed either periodically and/or as needed in another aspect. Of course, the scope of claimed subject matter is not limited to any particular frequency and/or schedule for performing self-calibration operations. Further, in another aspect, self-calibration operations may be performed for any of the examples described herein.

Figure 4:
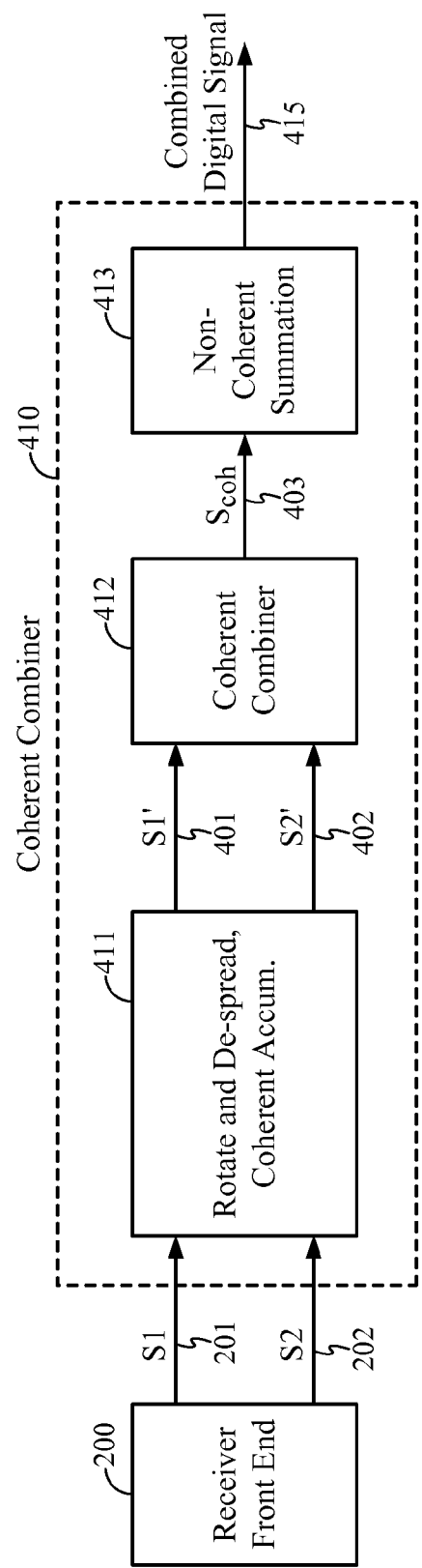
FIG. 4 is a schematic block diagram of an example coherent combiner unit.

FIG. 4 is a schematic block diagram of an example coherent combiner unit 410. As with the example of FIG. 3, described above, to improve mobile station receiver performance in light of various signal degrading conditions, a mobile station may incorporate two or more physically separated antennae coupled to receiver front end 200 with multiple paths, and combining the signals from the different paths may improve signal quality.

For the example of FIG. 4, example receiver front end 200, described above and depicted in FIG. 2, may generate two complex digital signals S1 201 and S2 202. The two complex digital signals for this example may be coherently combined by coherent combiner unit 410 to produce a combined digital signal 415 for use in position estimation operations, to name but one example application. Combined digital signal 415 in one aspect may undergo peak detection operations in preparation for additional processing as part of position estimation operations for the mobile station, to name but one example application.

Coherent combiner 410 may comprise a first unit 411 where the two complex digital signals S1 201 and S2 202 may undergo despreading and rotation operations using techniques known to those of ordinary skill in the art, for example. Also, a coherent accumulation operation may be performed at unit 411. The resulting sample streams S1' 401 and S2' 402 may be received at a coherent combiner 412. Combiner 412 may generate a coherent sample stream $S_{coh}$ 403 that may undergo a non-coherent summation at unit 413 to produce combined digital signal 415. These operations may be performed on a per satellite basis, in one aspect, although the scope of claimed subject matter is not limited in these respects.

It should also be observed that for the coherent combining example of FIG. 4, two separate branches are maintained until the signals are combined at coherent combiner 412. In an aspect, separate branches are maintained for the rotation and despreading operations, and are further maintained for the coherent accumulation performed at unit 411. The resulting sums of the coherent accumulations for each branch are presented to coherent combiner 412, and the non-coherent summation may be performed on the combined stream at unit 413. For the present example, S1' 401 and S2' 402 represent rotated and despread S1 and S2 signals, respectively, that have further undergone coherent accumulations in unit 411. Continuing with the present example, let $$S1' = \sum_{i=1}^{M} (I_{i,1} + jQ_{i,1}), \quad (2)$$

$$S2' = \sum_{i=1}^{M} (I_{i,2} + jQ_{i,2})$$

where $I_{i,1}$, $Q_{i,1}$, $I_{i,2}$, $Q_{i,2}$ are the in-phase and quadrature samples for the two branches for S1 and S2 and M is the number of coherent summations.

Coherent combiner 412 may estimate the phase difference $\hat{\theta}$ between the two branches and rotate one of the branches to align it in phase with the other branch and sum the two signal streams from the two respective branches to produce a single stream of $\{I_{coh}, Q_{coh}\}$ samples. The coherent combined stream $S_{coh}$ 403 is given for this example by $$S_{coh} = S1'^* e^{j\hat{\theta}} + S2' = I_{coh} + jQ_{coh} \quad (3)$$

The combined $\{I_{coh}, Q_{coh}\}$ samples from stream 403 may be non-coherently summed according to $$\text{combined\_signal} = \sum_{i=1}^{K} (I_{coh}^2 + Q_{coh}^2) \quad (4)$$

to generate combined digital signal 415. As with the previous examples, combined signal 415 may be subject to further processing similar to what may occur in receivers with single antennas to identify the peak and to provide measurements for navigational operations, for one example application. However, because for this example two signals from physically separated antennae have been combined, signal integrity may be improved, and receiver performance may therefore be enhanced.

FIG. 5 is a schematic block diagram of an example tracking unit 510. For this example, signals from the two branches may be combined during tracking operations, which may improve tracking performance. Also for this example, the two paths perform their own processing including rotation and despreading operations at unit 511, and coherent accumulations also at unit 511.

In an aspect, two phase locked loop (PLL) units 520 and 530 may receive streams 501 and 502 of coherent samples from unit 511 following the rotation, despreading, and coherent accumulation operations of unit 511. In an aspect, PLL units 520 and 530 may comprise Costas PLL units, although the scope of claimed subject matter is not limited in this respect. PLL units 520 and 530 may provide phase estimation and phase rotation for the two respective paths. The phase rotated sample streams 521 and 531 from PLL units 520 and 530, respectively, may be coherently integrated at coherent combiner 540 to generate a combined digital signal 545 that may be provided to a position engine, for example. In other aspects, the improved quality and availability of the integrated samples from combined digital signal 545 may be utilized advantageously in other operations such as, for example, loss of lock detection, signal strength estimation, improved data demodulation, and improved bit error rate (BER).

FIG. 6 is a schematic block diagram of example PLL unit 520. For this example, PLL unit 520 comprises a phase rotation unit 522, a phase discriminator 524, a loop filter 526, and a scale function 528. As mentioned previously, PLL unit 520 receives the stream of coherent samples 501 from one of the two branches, and generates a stream of phase rotated samples 521 to be delivered to coherent combiner 540. Scale values may also be transmitted from PLL 520 to combiner 540. For the present example, the inputs to phase rotation unit 522 and scale function 528 comprise the coherent samples $\{I, Q\}$ with a pre-detection integration (PDI) or coherent integration period of 20 ms. Also, for the present example, scale function unit 528 may utilize a smoothed estimate of scale=$\Sigma(I^2+Q^2)$ using single pole smoothing with parameter $\alpha=0.9$, corresponding for this example to a time constant of 10 PDI samples. The filtered scale function may be expressed as follows:

$$\text{scale\_filtered} = \alpha * \text{scale\_filtered} + (1-\alpha) * \text{scale} \quad (5)$$

In another aspect, the loop bandwidth for the example of FIG. 6 may be 1.0 Hz for the present example, and the loop iteration rate may be selected to be 50.0 Hz. However, these are merely example bandwidth and loop iteration values, and the scope of claimed subject matter is not limited in this respect. Further, the outputs of PLL unit 520 may comprise the rotated samples $\{I_{rot}, Q_{rot}\}$ as mentioned previously along with the PLL state. Also, for the present example, the rotated samples from PLL units 520 and 530 may be coherently summed by coherent combiner 540 according to the following:

$$\frac{(Scale_1 * I_{rot,1} + Scale_2 * I_{rot,2})}{Scale_1 + Scale_2} \quad (6)$$

In another aspect, a selection may be made between the two branches of rotated samples generated by PLL units 520 and 530, respectively. The selection may be made in order to utilize one branch at a time rather than combining the two branches. For one example, the selection may be made every 20 ms, although the scope of claimed subject matter is not limited in this respect. In another aspect, the selection may be based, at least in part, on a smoothed $I_{rot}$, with the larger of the two values determining the selected branch.

Figure 7:
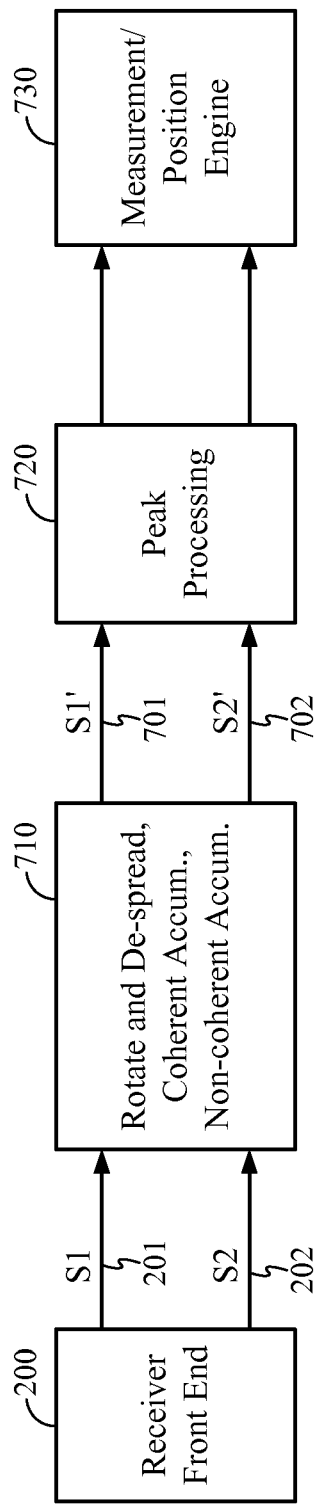
FIG. 7 is a schematic block diagram of an example selection diversity configuration.

FIG. 7 is a schematic block diagram of an example selection diversity configuration comprising receiver front end 200, a unit 710 for performing rotation, despreading, coherent accumulation, and non-coherent accumulation operations, a peak processing unit 720, and a measurement and position engine 730. As used herein, the term "selection diversity" refers to a process of selecting one of two or more signal streams, or branches. As can be seen in the example of FIG. 7, the two example signal streams or branches remain separate all of the way from receiver front end 200 to measurement and position engine 730. The two branches are not combined in this example at any point. Peak processing may be performed by unit 720, and measurements from both branches may be provided to measurement and position engine 730. For the present example, measurement and position engine 730 may determine which of the two branches to use in position calculations. A confidence indicator may also be provided to measurement and position engine 730. In one aspect, the confidence indicator may comprise estimated signal strengths for the two branches.

In another aspect, the selection diversity example of FIG. 7 may be utilized with a tracking coherent combiner such as that discussed above and as depicted in FIG. 5. In such an implementation, measurement and position engine 730 may receive inputs from peak processing unit 720, and may also receive inputs from the tracking combiner.

Figure 8:
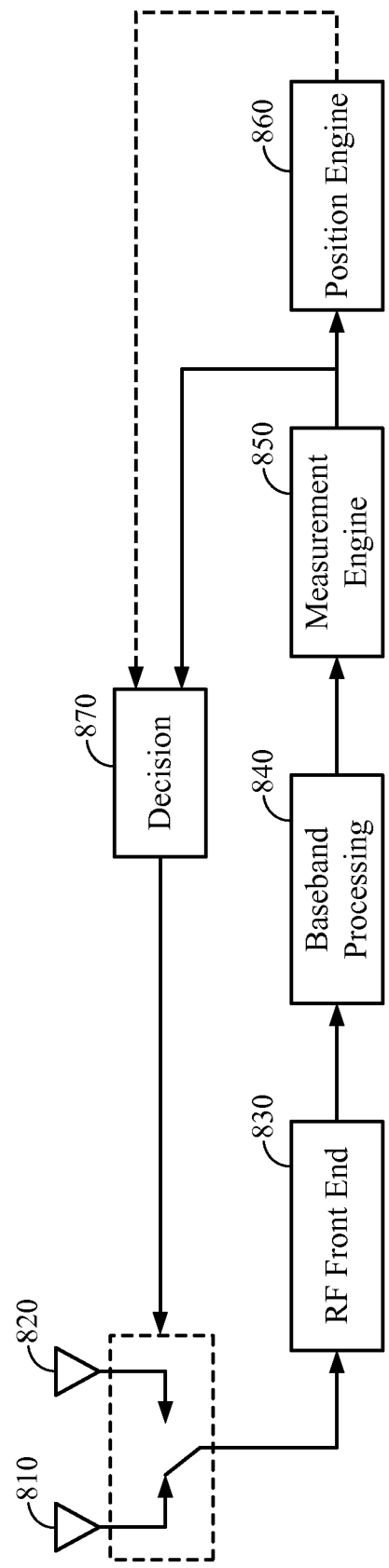
FIG. 8 is a schematic block diagram of an example scanning diversity configuration.

FIG. 8 is a schematic block diagram of an example scanning diversity configuration. As used herein, the term "scanning diversity" refers to a technique of scanning two of more antennae, and selecting one of the antennae based at least in part on a performance metric. The selected path may be used for a fixed duration or until the performance metric computed based on one or more signals received at the selected antenna degrades below a programmable threshold, which triggers a new scan to determine the better performing path. As depicted in FIG. 8, a pair of antennae 810 and 820 are provided. Either of the antennae may be selected depending at least in part on a determination made by a decision unit 870. The selected antenna may provide radio frequency (RF) front end 830 with an RF signal received from a GNSS, for one example. Various example aspects related to the performance metric are discussed below.

In another aspect, a measurement engine 850 may receive a sample stream from baseband processing unit 840, and information from measurement engine 850 may be provided to position engine 860. Decision unit 870 may receive a decision metric from either measurement engine 850 for a "single shot" application such as an E911 call, for example, or from position engine 860 for continuous navigation applications, for another example. As may be seen in FIG. 8, a single receiver chain comprising RF front end 830 and baseband processing unit 840 may be shared between the two antennae. Thus, one advantage of this implementation is reduced cost. However, because measurements from signals from both antennae are not available at the same time, performance improvements may not be quite as significant as with the example selection diversity implementation discussed above.

Depending on whether the intended application is a single shot type of application such as an E911 call, or whether the application is a continuous navigation application, the operation of the example of FIG. 8 may vary in some respects. For example, for an E911 call, the decision metric provided to decision unit 870 may be based at least in part on a measurement from measurement engine 850, while for a continuation navigation application the decision may be based at least in part on position from position engine 860.

For a single shot application, the application may be constrained by a particular quality of service (QoS). For example, an E911 call may have a maximum allowable time for obtaining a single position fix. In general, for one example implementation, a shallow search may be performed using each of the two antennae. An antenna may be selected based on decision metrics obtained as a result of the shallow searches, and processing may continue using the selected path.

To explain the present example in a bit more detail, for the single shot application implementation the process may begin with the antenna 810. A shallow search, also referred to as a shallow mode acquisition, may be performed using a signal received from antenna 810, and a performance metric may be estimated and stored based at least in part on measurements obtained from the signal provided by antenna 810. For one example implementation, the performance metric may comprise the number of satellites acquired during the shallow search. Another example performance metric may be an estimated average signal strength across all acquired satellites. As used herein, the term "shallow search" relates to a relatively fast search compared to a QoS time constraint. Of course, these are merely example performance metrics, and the scope of claimed subject matter is not limited in this respect.

At least in part in response to storing the performance metric from antenna 810, the algorithm may switch to antenna 820. Another shallow search is performed, this time using the signal received at antenna 820. A performance metric based on measurements from the signal from antenna 820 may be estimated and stored. The stored metrics may be compared, and an appropriate antenna selected. The selection may be based, at least in part, on the antenna with the most advantageous performance metric. Processing may continue using the selected antenna until the single shot application has completed. Of course, the algorithm described above is merely an example, and the scope of claimed subject matter is not limited to the particular techniques and operations described.

In another aspect, for a continuous tracking or navigation application, if the receiver is operating in a least squares mode for one example implementation, the performance metric may be based, at least in part, on a horizontal estimated position error reported to decision unit 870 by position engine 860. As with the single shot application implementation, shallow searches may be performed using signals received at the two respective antenna, and the performance metrics may be stored. The metrics may be compared, and the antenna with the most advantageous performance metric may be selected. Processing may then continue using that antenna for a period of time. At least in part in response to that period of time elapsing, a new round of shallow searches may be performed and performance metrics obtained and compared to make a new selection based on current conditions. In this manner, the example scanning diversity implementation depicted in FIG. 8 periodically determines which antenna is receiving the better signal, and operations are performed using that antenna until a new determination is made.

Alternatively, in another aspect, instead of periodically scanning the antennae to select the "best" one, processing may continue with a selected antenna until a selected performance metric for that antenna falls below a specified threshold. If the performance metric falls below the threshold after a minimum dwell time, the antennae may be scanned as described above to determine the most appropriate antenna for the application.

Figure 9:
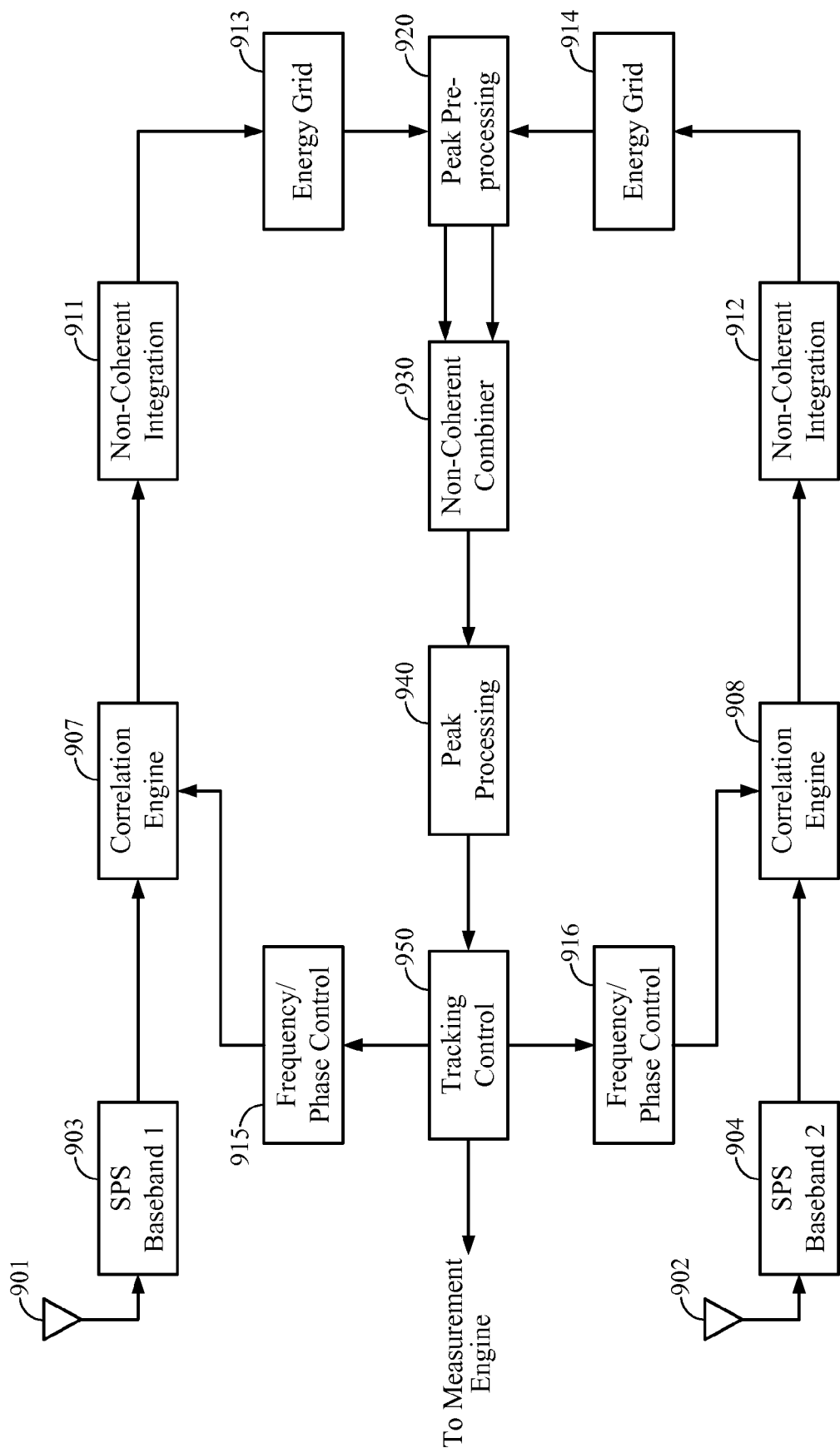
FIG. 9 is a schematic block diagram of an example mobile receiver and non-coherent signal combiner for a mobile station.

FIG. 9 is a schematic block diagram of an example mobile receiver and non-coherent signal combiner for a mobile station, such as mobile station 100 depicted in FIG. 1. The mobile station for this example comprises antennae 901 and 902 coupled to SPS baseband units 903 and 904, respectively. SPS baseband unit 903 may comprise a receiver front end path such as that depicted in FIG. 2, for one example. Similarly, SPS baseband unit 904 may comprise a separate receiver path. SPS baseband units 903 and 904 provide complex digital signals to correlation engines 907 and 908, respectively.

Correlation engine 907 and frequency/phase control unit 915 may perform a coherent accumulation. Similarly, for the other branch, correlation engine 908 and frequency/phase control unit 916 may perform a coherent accumulation. Non-coherent integrations may be performed in the two branches at units 911 and 912, respectively, and the results of the integrations are stored in energy grids 913 and 914, respectively.

In another aspect, peak pre-processing of the two data streams may occur at unit 920, and the two streams may be combined by a non-coherent combiner 930 to generate a combined digital signal to provide to peak processing unit 940. For the present example, peak pre-processing may comprise determining whether a signal is present at the respective branches. Non-coherent combiner 930 for this example may comprise a combiner similar to non-coherent combiner 312, discussed above in connection with FIG. 3. In an aspect, non-coherent combiner 930 may utilize a weighted combining technique if it is known that antennas 901 and 902 have different gains. For example, if it is known that antenna 902 has four dB more conducted and/or radiate loss relative to antenna 901, combiner 930 may give more weight to the data stream originating with antenna 901. Continuing with the present example, a tracking control unit 950 may receive information from peak processing unit 940, and tracking control unit 950 may in turn provide information to a measurement engine (not shown).

It may be noted that the example of FIG. 9 comprises similar functionality to the example depicted in FIG. 3. However, although a particular configuration of functional units has been described, the configuration and operations described are merely examples, and the scope of claimed subject matter is not limited in these respects.

Figure 10:
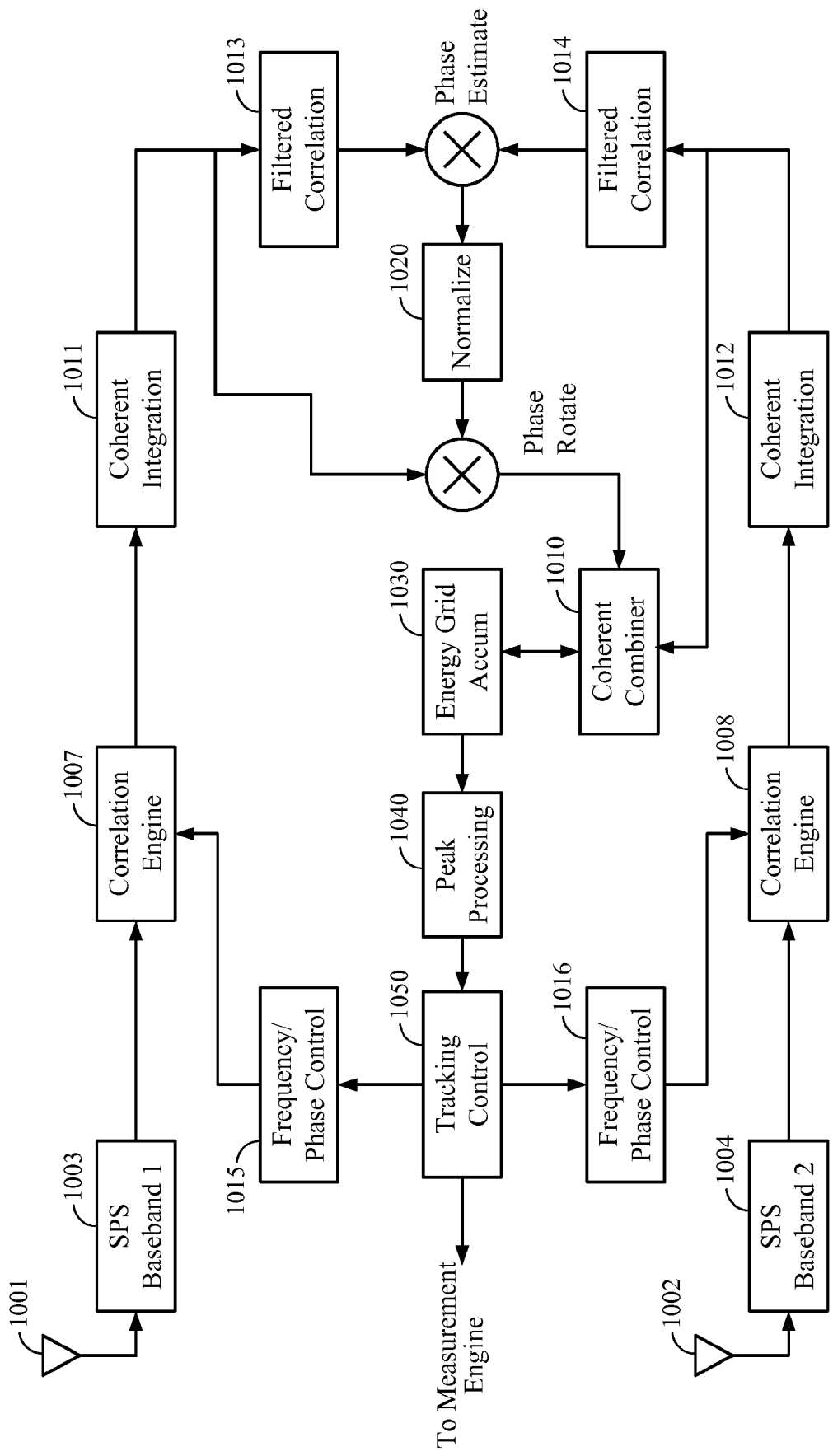
FIG. 10 is a schematic block diagram of an example mobile receiver and coherent signal combiner for a mobile station.

FIG. 10 is a schematic block diagram of an example mobile receiver and coherent signal combiner for a mobile station, such as mobile station 100 depicted in FIG. 1. The mobile station for this example comprises antennae 1001 and 1002 coupled to SPS baseband units 1003 and 1004, respectively. SPS baseband units 1003 and 1004 provide complex digital signals to correlation engines 1007 and 1008, respectively.

Correlation engine 1007 and frequency/phase control unit 1015 may perform a coherent accumulation. Similarly, for the other branch, correlation engine 1008 and frequency/phase control unit 1016 may perform a coherent accumulation. Coherent integrations may be performed in the two branches at units 1011 and 1012, respectively. Filtered correlation units 1013 and 1014 and normalize unit 1020 aid in performing despreading and phase estimation and rotation operations.

In another aspect of the present example, coherent combiner 1010 receives the two aligned sample streams from the two separate branches and performs a coherent integration to combine the two streams. In an aspect, coherent combiner 1010 may utilize a weighted combining technique if it is known that the two antennas 1001 and 1002 have different gains. For example, if it is known that antenna 1002 has four dB more conducted and/or radiate loss relative to antenna 1001, coherent combiner 1010 may give more weight to the data stream originating with the antenna 1001. For one example, coherent combiner 1010 may comprise a combiner similar to coherent combiner 412 described above and depicted in FIG. 4. Also for the present example, an energy grid accumulator 1030 may perform a non-coherent accumulation of the combined signal generated by coherent combiner 1010. In another aspect, a tracking control unit 1050 may receive information from peak processing unit 1040, and tracking control unit 1050 may in turn provide information to a measurement engine (not shown).

It may be noted that the example of FIG. 10 comprises similar functionality to the example depicted in FIG. 5. However, although a particular configuration of functional units has been described, the configuration and operations described are merely examples, and the scope of claimed subject matter is not limited in these respects.

Figure 11:
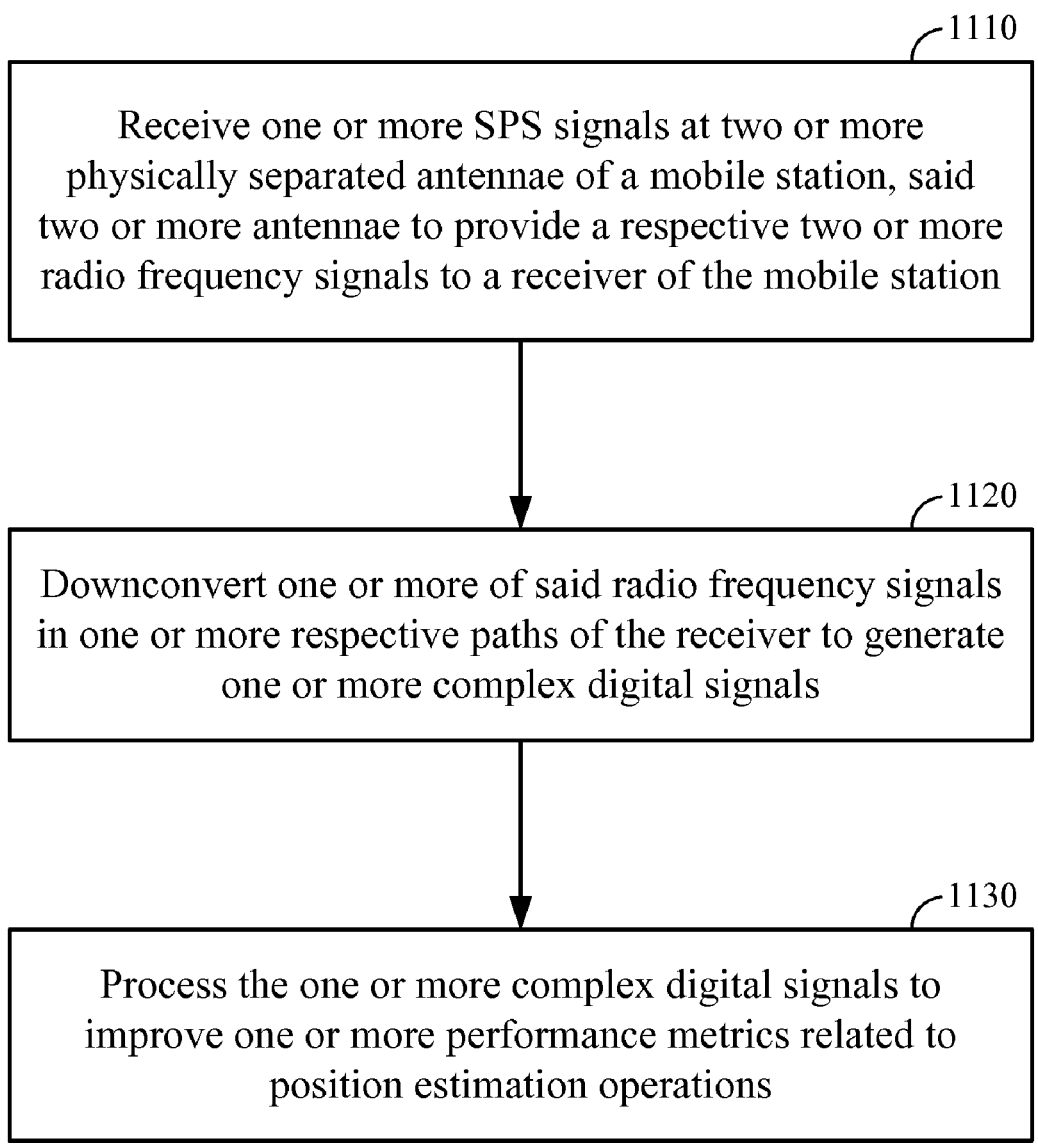
FIG. 11 is a flow diagram of an example embodiment of a method for processing one or more wireless signals at a receiver with two or more physically separated antennae.

FIG. 11 is a flow diagram of an example embodiment of a method for processing one or more wireless signals at a receiver with two or more physically separated antennae. At block 1110, one or more wireless signals may be received at the two or more physically separated antennae. The two or more antennae may provide a respective two or more radio frequency signals to a receiver of a mobile station. At block 1120, one or more of said radio frequency signals may be downconverted in one or more respective paths of the receiver to generate one or more complex digital signals comprising in-phase and quadrature components. At block 1130, the one or more complex digital signals may be processed to improve one or more performance metrics related to position estimation operations. Various examples may include fewer than, all of, or more than blocks 1110-1130. Furthermore, the order of blocks 1110-1130 is merely an example order, and the scope of claimed subject matter is not limited in this respect.

Figure 12:
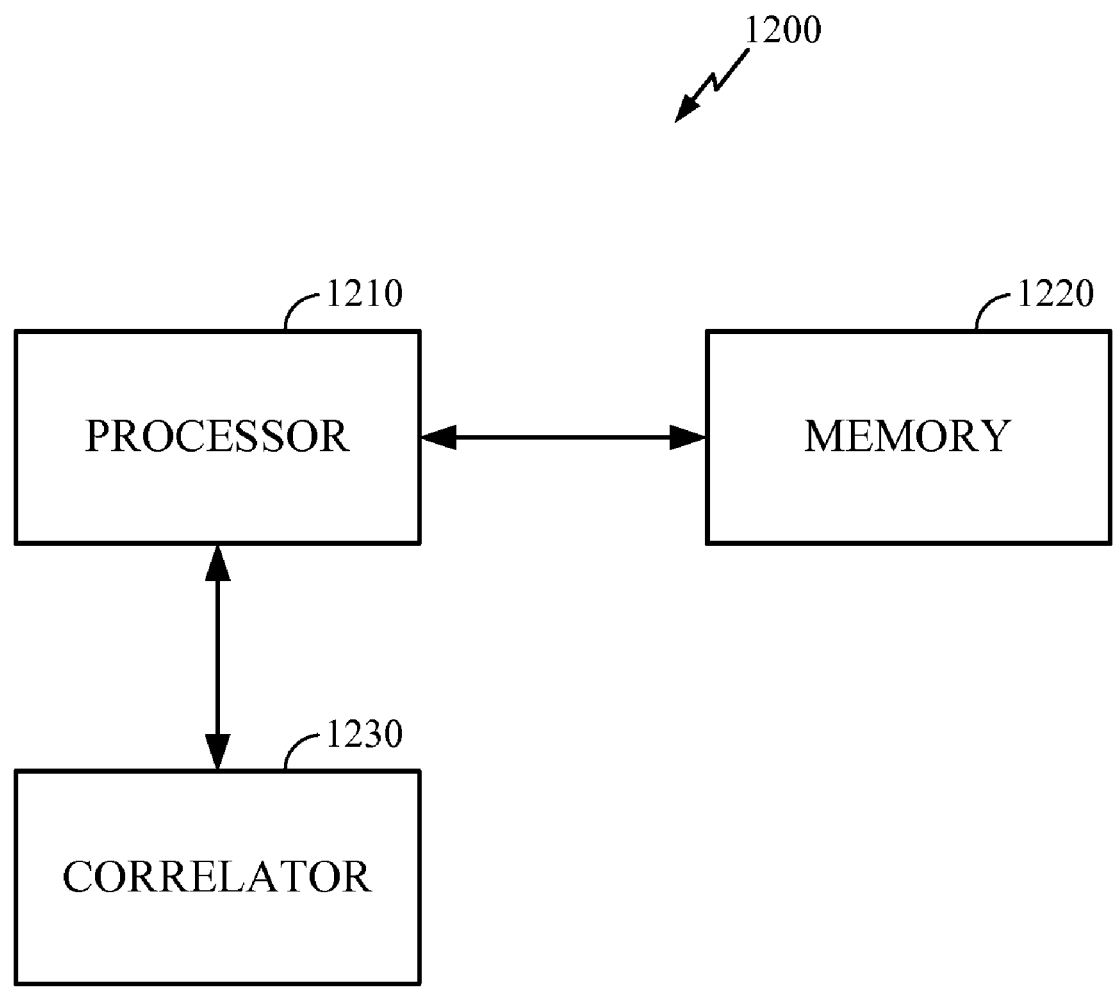
FIG. 12 is a schematic diagram of a system for processing signals to determine a position location according to one aspect.

FIG. 12 illustrates a system for acquiring periodically repeating signals from space vehicles (SV) according to one example. However, this is merely an implementation of a system that is capable of acquiring such signals according to a particular example and other systems may be used without deviating from claimed subject matter. As illustrated in FIG. 12 according to a particular implementation, such a system may comprise a computing platform including a processor 1210, memory 1220, and correlator 1230. Correlator 1230 may be adapted to produce correlation functions from signals provided by a receiver front end (not shown) to be processed by processor 1210, either directly or through memory 1220. Correlator 1230 may be further adapted to perform any of the accumulation, integration, and/or combining functions described in connection with the various examples herein. Correlator 1230 may be implemented in hardware, software, or a combination of hardware and software. However, these are merely examples of how a correlator may be implemented according to particular aspects and claimed subject matter is not limited in these respects.

According to an example, memory 1220 may store machine-readable instructions which are accessible and executable by processor 1210 to provide at least a portion of a computing platform. In a particular example, although claimed subject matter is not limited in these respects, processor 1210 may direct correlator 1230 to search for position estimation signals as illustrated above and derive measurements from correlation functions generated by correlator 1230, including but not limited to the accumulation, integration, and/or combining functions described above.

Figure 13:
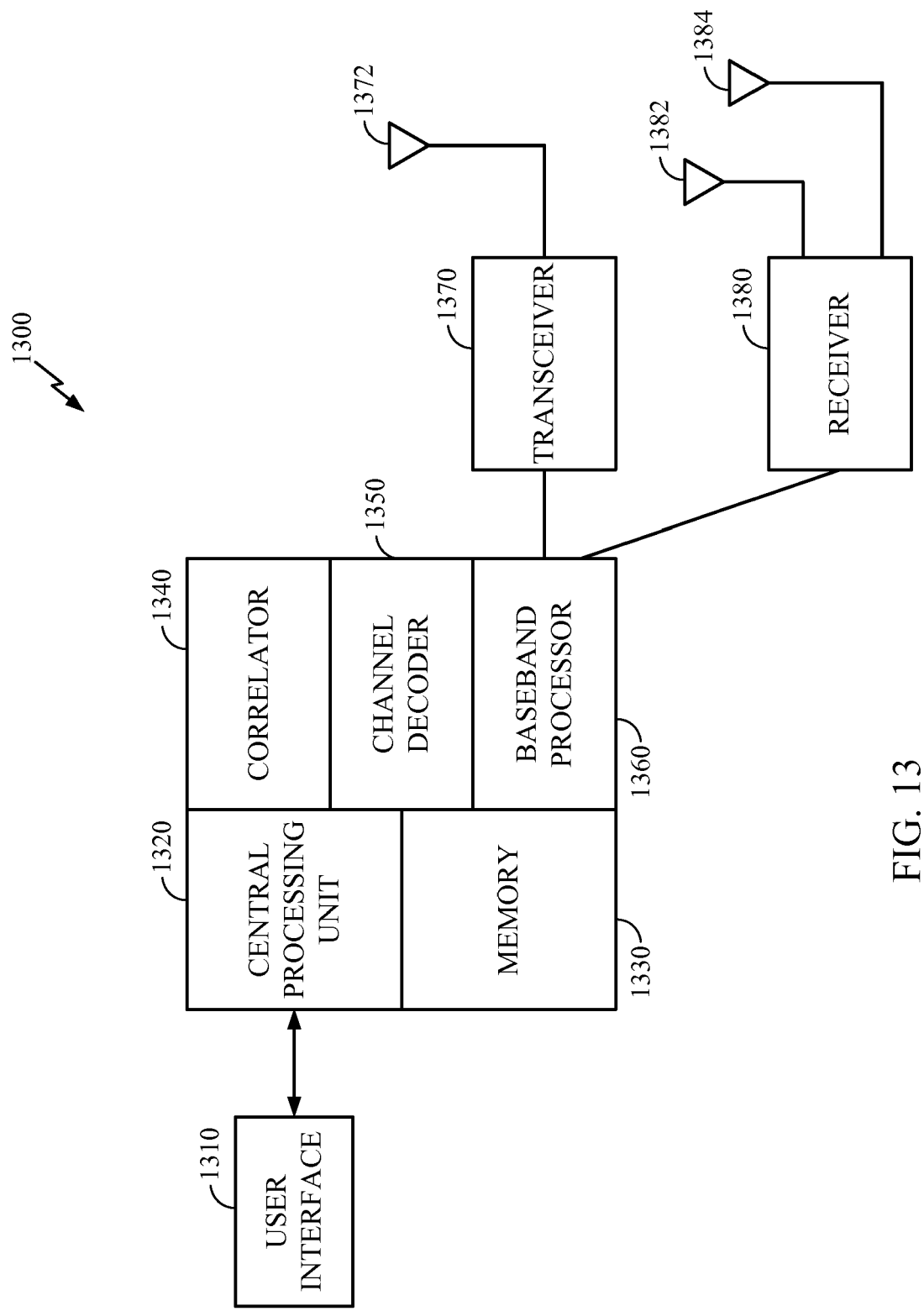
FIG. 13 is a schematic diagram of a mobile station according to one aspect.

FIG. 13 depicts an example mobile station 1300 incorporating multiple antenna and further incorporating receiver circuitry as described in the examples above. Implementations of a receiver as described herein may be incorporated in any one of several devices such as, for example, a mobile station, base station and/or car navigation systems. Such a mobile station may comprise any of several devices such as, for example, a mobile phone, notebook computer, personal digital assistant, personal navigation device and/or the like. Here, FIG. 13 shows a particular implementation of a mobile station in which radio transceiver 1370 may be adapted to modulate an RF carrier signal with baseband information, such as voice or data, onto an RF carrier, and demodulate a modulated RF carrier to obtain such baseband information. An antenna 1372 may be adapted to transmit a modulated RF carrier over a wireless communications link and receive a modulated RF carrier over a wireless communications link.

Baseband processor 1360 may be adapted to provide baseband information from CPU 1320 to transceiver 1370 for transmission over a wireless communications link. Here, CPU 1320 may obtain such baseband information from an input device within user interface 1310. Baseband processor 1360 may also be adapted to provide baseband information from transceiver 1370 to CPU 1320 for transmission through an output device within user interface 1310. User interface 1310 may comprise a plurality of devices for inputting or outputting user information such as voice or data. Such devices may include, for example, a keyboard, a display screen, a microphone, and a speaker.

SPS receiver (SPS Rx) 1380 may be adapted to receive and demodulate transmissions from SVs through SPS antennae 1382 and 1384, and provide demodulated information to correlator 1340. Correlator 1340 may be adapted to derive correlation functions from the information provided by receiver 1380. For a given PN code, for example, correlator 1340 may produce a correlation function defined over a range of code phases to set out a code phase search window, and over a range of Doppler frequency hypotheses. As such, an individual correlation may be performed in accordance with defined coherent and non-coherent integration parameters.

In an aspect, receiver 1380 may comprise a receiver front end similar to receiver front end 200 described above in connection with FIGS. 2-7. Such receiver front ends may comprise a GNSS receiver architecture where it is proposed to downconvert the complex signals in a primary path to a first intermediate frequency and the complex signals in a secondary path to a second intermediate frequency. In this way, the complex signals in the two paths can be combined into one complex signal, which will enable sharing the same baseband filter and analog-to-digital converter, in an aspect. The two GNSS signals can be separated in baseband processors by a complex down-conversion. Other implementations for receiver 1380 are possible, such as those example implementations described above, and the scope of claimed subject matter is not limited in this respect.

Correlator 1340 may also be adapted to derived pilot-related correlation functions from information relating to pilot signals provided by transceiver 1370. This information may be used by a subscriber station to acquire wireless communications services. Correlator 1340 may also be adapted to perform any of the accumulation, integration, and/or combining operations described in connection with the example implementations discussed above. Similarly, baseband processor 1360 may also be adapted to perform any of the accumulation, integration, and/or combining operations described herein.

Channel decoder 1350 may be adapted to decode channel symbols received from baseband processor 1360 into underlying source bits. In one example where channel symbols comprise convolutionally encoded symbols, such a channel decoder may comprise a Viterbi decoder. In a second example, where channel symbols comprise serial or parallel concatenations of convolutional codes, channel decoder 1350 may comprise a turbo decoder.

Memory 1330 may be adapted to store machine-readable instructions which are executable to perform one or more of processes, examples, implementations, or examples thereof which have been described or suggested. CPU 1320 may be adapted to access and execute such machine-readable instructions. Through execution of these machine-readable instructions, CPU 1320 may direct correlator 1340 to analyze the SPS correlation functions provided by correlator 1340, derive measurements from the peaks thereof, and determine whether an estimate of a location is sufficiently accurate. However, these are merely examples of tasks that may be performed by a CPU in a particular aspect and claimed subject matter in not limited in these respects.

In a particular example, CPU 1320 at a mobile station may estimate a location the mobile station based, at least in part, on signals received from SVs as illustrated above. CPU 1320 may also be adapted to determine a code search range for acquiring a second received signal based, at least in part, on a code phase detected in a first received signals as illustrated above according to particular examples. It should be understood, however, that these are merely examples of systems for estimating a location based, at least in part, on pseudorange measurements, determining quantitative assessments of such pseudorange measurements and terminating a process to improve accuracy of pseudorange measurements according to particular aspects, and that claimed subject matter is not limited in these respects.

Although antennae 1382 and 1384 are described herein as comprising SPS antennae, that is, antennae adapted to receive SPS signals, the scope of claimed subject matter is not limited in this respect, and other example implementations may incorporate other types of antennae. In one aspect, one or more of the antennae may comprise an antenna adapted to receive wireless cellular network signals in addition to SPS signals.

The methodologies described herein may be implemented by various means depending upon applications according to particular examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Techniques described herein may be used with any one or more of several SPS, including the aforementioned SPS, for example. Furthermore, such techniques may be used with positioning determination systems that utilize pseudolites or a combination of satellites and pseudolites. Pseudolites may comprise ground-based transmitters that broadcast a PRN code or other ranging code (e.g., similar to a GPS or CDMA cellular signal) modulated on an L-band (or other frequency) carrier signal, which may be synchronized with GPS time. Such a transmitter may be assigned a unique PRN code so as to permit identification by a remote receiver. Pseudolites may be useful in situations where SPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others.

The term "SPS signals", as used herein, is intended to include SPS-like signals from pseudolites or equivalents of pseudolites.

A "space vehicle" (SV) as referred to herein relates to an object that is capable of transmitting signals to receivers on the Earth's surface. In one particular example, such an SV may comprise a geostationary satellite. Alternatively, an SV may comprise a satellite traveling in an orbit and moving relative to a stationary position on the Earth. However, these are merely examples of SVs and claimed subject matter is not limited in these respects.

Techniques described herein may also be used to receive and process signals for various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Such location determination techniques described herein may also be used for any combination of WWAN, WLAN and/or WPAN.

The terms, "and," "and/or," and "or" as used herein may include a variety of meanings that will depend at least in part upon the context in which it is used. Typically, "and/or" as well as "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

The invention claimed is:

1. A method, comprising:
   receiving one or more satellite positioning system (SPS) signals at two or more physically separated antennae of a mobile station, said two or more antennae to provide a respective two or more radio frequency signals to a receiver of the mobile station;
   downconverting one or more of said radio frequency signals in one or more respective paths of a front end of the receiver to generate two or more complex digital signals comprising in-phase and quadrature components; and
   processing the two or more complex digital signals by combining the two or more complex digital signals to generate a combined digital signal according to a coherent combining algorithm, the processing being performed at least in part to improve one or more performance metrics related to position estimation operations,
   wherein said coherent combining algorithm comprises:
   despreading and rotating the two or more complex digital signals, respectively;
   coherently accumulating the results of the despreading and rotating operations for the two or more complex digital signals, respectively;
   estimating one or more phase differences among the two or more complex digital signals; and
   phase aligning said results of said coherent accumulation.

2. The method of claim 1, wherein said processing the two or more complex digital signals comprises detecting one or more peaks.

3. The method of claim 1, wherein said combining the two or more complex digital signals comprises combining the two or more complex digital signals according to a non-coherent combining algorithm.

4. The method of claim 3, wherein said non-coherent combining algorithm comprises:
   despreading and rotating the two or more complex digital signals, respectively;
   coherently accumulating the results of the despreading and rotating operations for the two or more complex digital signals, respectively;
   non-coherently accumulating the results of the coherent accumulation for the two or more complex digital signals, respectively; and
   adding the two or more non-coherent accumulations to generate the combined digital signal.

5. The method of claim 4, wherein said adding the two or more non-coherent accumulations comprises a weighed sum depending, at least in part, on respective gains of the two or more antennae.

6. The method of claim 1, wherein said coherent combining algorithm further comprises:
   coherently combining the results of the phase aligned results of the coherent accumulation; and
   non-coherently summing the results of the coherent combining operation to generate the combined digital signal.

7. The method of claim 1, wherein said processing the complex digital signals comprises selecting one of the complex digital signals for position computation at least in part in response to a comparison of two or more respective confidence indicators for the two or more complex digital signals.

8. The method of claim 7, wherein said two or more confidence indicators are based at least in part on two or more signal strength estimates for the respective two or more complex digital signals.

9. A method, comprising:
receiving one or more satellite positioning system (SPS) signals at two or more physically separated antennae of a mobile station, said two or more antennae to provide a respective two or more radio frequency signals to a receiver of the mobile station;
downconverting one or more of said radio frequency signals in one or more respective paths of a front end of the receiver to generate one or more complex digital signals comprising in-phase and quadrature components;
processing the one or more complex digital signals at least in part to improve one or more performance metrics related to position estimation operations;
performing two or more sequential shallow searches using said two or more radio frequency signals from the respective two or more antennae and using a single receiver path, said shallow searches to yield two or more performance metrics associated with the respective two or more shallow searches; and
selecting one of the two or more antennae based at least in part on a comparison of the two or more performance metrics.

10. The method of claim 9, wherein said two or more performance metrics comprise numbers of space vehicles acquired from the two or more radio frequency signals, respectively.

11. The method of claim 9, wherein said two or more performance metrics are based at least in part on signal strength estimates from the two or more radio frequency signals, respectively.

12. A mobile station, comprising:
two or more physically separated antennae to receive one or more SPS signals and to provide a respective two or more radio frequency signals;
a receiver comprising one or more paths to receive the two or more radio frequency signals from the respective two or more antennae, the one or more paths comprising a respective one or more complex mixers to downconvert one or more of said radio frequency signals to generate two or more complex digital signals comprising in-phase and quadrature components; and
a digital baseband processing engine to process the two or more complex digital signals, said digital baseband processing engine including a combining unit that combines the two or more complex digital signals to generate a combined digital signal according to a coherent combining algorithm, the combining of the two or more complex digital signals being performed at least in part to improve one or more performance metrics related to position estimation operations;
said combining unit to coherently combine the two or more complex digital signals by:
despreading and rotating the two or more complex digital signals, respectively;
coherently accumulating the results of the despreading and rotating operations for the two or more complex digital signals, respectively;
estimating one or more phase differences among the two or more complex digital signals; and
phase aligning said results of said coherent accumulation.

13. The mobile station of claim 12, said digital baseband processing engine to process said two or more complex digital signals at least in part be detecting one or more peaks.

14. The mobile station of claim 12 said combining unit to combine the two or more complex digital signals according to a non-coherent combining algorithm.

15. The mobile station of claim 14, said combining unit to non-coherently combine the two or more complex digital signals by:
despreading and rotating the two or more complex digital signals, respectively;
coherently accumulating the results of the despreading and rotating operations for the two or more complex digital signals, respectively;
non-coherently accumulating the results of the coherent accumulation for the two or more complex digital signals, respectively; and
adding the two or more non-coherent accumulations to generate the combined digital signal.

16. The mobile station of claim 15, said combining unit to add the two or more non-coherent accumulations at least in part by utilizing a weighed sum depending, at least in part, on respective gains of the two or more antennae.

17. The mobile station of claim 12, said combining unit to further coherently combine the two or more complex digital signals by:
coherently combining the results of the phase aligned results of the coherent accumulation; and
non-coherently summing the results of the coherent combining operation to generate the combined digital signal.

18. The mobile station of claim 12, said digital baseband processing engine further to select one of the complex digital signals for position computation at least in part in response to a comparison of two or more respective confidence indicators for the two or more complex digital signals.

19. A mobile station, comprising:
two or more physically separated antennae to receive one or more SPS signals and to provide a respective two or more radio frequency signals;
a receiver comprising one or more paths to receive the two or more radio frequency signals from the respective two or more antennae, the one or more paths comprising a respective one or more complex mixers to downconvert one or more of said radio frequency signals to generate two or more complex digital signals comprising in-phase and quadrature components; and
a digital baseband processing engine to process the two or more complex digital signals at least in part to improve one or more performance metrics related to position estimation operations,
said digital baseband processing engine further to select one of the complex digital signals for position computation at least in part in response to a comparison of two or more respective confidence indicators for the two or more complex digital signals,
wherein said two or more confidence indicators are based at least in part on two or more signal strength estimates for the respective two or more complex digital signals.

20. A mobile station, comprising:
two or more physically separated antennae to receive one or more SPS signals and to provide a respective two or more radio frequency signals;
a receiver comprising one or more paths to receive the two or more radio frequency signals from the respective two or more antennae, the one or more paths comprising a respective one or more complex mixers to downconvert one or more of said radio frequency signals to generate one or more complex digital signals comprising in-phase and quadrature components; and a digital baseband processing engine to process the one or more complex digital signals at least in part to improve one or more performance metrics related to position estimation operations, said digital baseband processing engine further to perform two or more sequential shallow searches using said two or more radio frequency signals from the respective two or more antennae and using a single receiver path, said shallow searches to yield two or more performance metrics associated with the respective two or more shallow searches, said digital baseband processing engine further to select one of the two or more antennae based at least in part on a comparison of the two or more performance metrics.

21. The mobile station of claim 20, wherein said two or more performance metrics comprise numbers of space vehicles acquired from the two or more radio frequency signals, respectively.

22. The mobile station of claim 20, wherein said two or more performance metrics comprise signal strength estimates from the two or more radio frequency signals, respectively.

23. An apparatus, comprising:
means for receiving one or more satellite positioning system (SPS) signals at two or more physically separated antennae of a mobile station, said two or more antennae to provide a respective two or more radio frequency signals to a receiver of the mobile station;
means for downconverting one or more of said radio frequency signals in one or more respective paths of a front end of the receiver to generate two or more complex digital signals comprising in-phase and quadrature components; and
means for processing the two or more complex digital signals at least in part to improve one or more performance metrics related to position estimation operations, wherein said means for processing the complex digital signals further comprises means for combining the two or more complex digital signals according to a coherent combining algorithm to generate a combined digital signal,
wherein said means for combining the two or more complex digital signals according to the coherent combining algorithm comprises:
means for despreading and rotating the two or more complex digital signals;
means for coherently accumulating the results of the despreading and rotating operations for the two or more complex digital signals, respectively;
means for estimating one or more phase differences among the two or more complex digital signals; and
means for phase aligning said results of said coherent accumulation.

24. The apparatus of claim 23, wherein said means for processing the two or more complex digital signals comprises means for detecting one or more peaks.

25. The apparatus of claim 23, wherein said means for combining the two or more complex digital signals comprises means for combining the two or more complex digital signals according to a non-coherent combining algorithm.

26. The apparatus of claim 25, wherein said means for combining the two or more complex digital signals according to the non-coherent combining algorithm comprises:
means for despreading and rotating the two or more complex digital signals, respectively;
means for coherently accumulating the results of the despreading and rotating operations for the two or more complex digital signals, respectively;
mean for non-coherently accumulating the results of the coherent accumulation for the two or more complex digital signals, respectively; and
means for adding the two or more non-coherent accumulations to generate the combined digital signal.

27. The apparatus of claim 26, wherein said means for adding the two or more non-coherent accumulations comprises means for performing a weighed sum depending, at least in part, on respective gains of the two or more antennae.

28. The apparatus of claim 23, wherein said means for combining the two or more complex digital signals according to the coherent combining algorithm further comprises:
means for coherently combining the results of the phase aligned results of the coherent accumulation; and
means for non-coherently summing the results of the coherent combining operation to generate the combined digital signal.

29. The apparatus of claim 23, wherein said means for processing the complex digital signals comprises means for selecting one of the complex digital signals for position computation at least in part in response to a comparison of two or more respective confidence indicators for the two or more complex digital signals.

30. The apparatus of claim 29, wherein said two or more confidence indicators are based at least in part on two or more signal strength estimates for the respective two or more complex digital signals.

31. An apparatus, comprising:
means for receiving one or more satellite positioning system (SPS) signals at two or more physically separated antennae of a mobile station, said two or more antennae to provide a respective two or more radio frequency signals to a receiver of the mobile station;
means for downconverting one or more of said radio frequency signals in one or more respective paths of a front end of the receiver to generate one or more complex digital signals comprising in-phase and quadrature components;
means for processing the one or more complex digital signals at least in part to improve one or more performance metrics related to position estimation operations;
means for performing two or more sequential shallow searches using said two or more radio frequency signals from the respective two or more antennae and using a single receiver path, said shallow searches to yield two or more performance metrics associated with the respective two or more shallow searches; and
means for selecting one of the two or more antennae based at least in part on a comparison of the two or more performance metrics.

32. The apparatus of claim 31, wherein said two or more performance metrics comprise numbers of space vehicles acquired from the two or more radio frequency signals, respectively.

33. The apparatus of claim 31, wherein said two or more performance metrics are based at least in part on signal strength estimates from the two or more radio frequency signals, respectively.

34. An article, comprising: a storage medium having stored thereon instructions that, if executed by a processor of a mobile station, direct the processor to:
process two or more complex digital signals comprising in-phase and quadrature components by combining the two or more complex digital signals according to a coherent combining algorithm to generate a combined digital signal that is used to perform position estimation operations, wherein said two or more complex digital signals are derived from one or more SPS signals received at two or more physically separated antennae of the mobile station,
wherein the combining the two or more complex digital signals according to the coherent combining algorithm comprises:
despreading and rotating the two or more complex digital signals;
coherently accumulating the results of the despreading and rotating operations for the two or more complex digital signals, respectively;
estimating one or more phase differences among the two or more complex digital signals; and
phase aligning said results of said coherent accumulation.

35. The article of claim 34, wherein the storage medium has stored thereon further instructions that, if executed, further direct the processor to process said one or more complex digital signals by detecting one or more peaks.

36. The article of claim 34, wherein the storage medium has stored thereon further instructions that, if executed, further direct the processor to combine the two or more complex digital signals by combining the two or more complex digital signals according to a non-coherent combining algorithm.

37. The article of claim 36, wherein the storage medium has stored thereon further instructions that, if executed, further direct the processor to combine the two or more complex digital signals according to the non-coherent combining algorithm by:
despreading and rotating the two or more complex digital signals, respectively;
coherently accumulating the results of the despreading and rotating operations for the two or more complex digital signals, respectively;
non-coherently accumulating the results of the coherent accumulation for the two or more complex digital signals, respectively; and
adding the non-coherent accumulations to generate the combined digital signal.

38. The article of claim 37, wherein the storage medium has stored thereon further instructions that, if executed, further direct the processor to add the non-coherent accumulations utilizing a weighed sum depending, at least in part, on respective gains of the two or more antennae.

39. The article of claim 34, wherein the storage medium has stored thereon further instructions that, if executed, further direct the processor to combine the two or more complex digital signals according to the coherent combining algorithm by:
coherently combining the results of the phase aligned results of the coherent accumulation; and
non-coherently summing the results of the coherent combining operation to generate the combined digital signal.

40. The article of claim 34, wherein the storage medium has stored thereon further instructions that, if executed, further direct the processor to process the complex digital signals by selecting one of the complex digital signals for position computation at least in part in response to a comparison of two or more respective confidence indicators for the two or more complex digital signals.

41. The article of claim 40, wherein said two or more confidence indicators are based at least in part on two or more signal strength estimates for the respective two or more complex digital signals.

42. An article, comprising a storage medium having stored thereon instructions that, if executed by a processor of a mobile station, direct the processor to:
process one or more complex digital signals comprising in-phase and quadrature components to perform position estimation operations, wherein said one or more complex digital signals are derived from one or more SPS signals received at two or more physically separated antennae of the mobile station;
perform two or more sequential shallow searches using said two or more radio frequency signals from the respective two or more antennae and using a single receiver path, said shallow searches to yield two or more performance metrics associated with the respective two or more shallow searches; and
select one of the two or more antennae based at least in part on a comparison of the two or more performance metrics.

43. The article of claim 42, wherein said two or more performance metrics comprise numbers of space vehicles acquired from the two or more radio frequency signals, respectively.

44. The article of claim 42, wherein said two or more performance metrics comprise signal strength estimates from the two or more radio frequency signals, respectively.

* * * * *